July 13, 1943.  M. SROB  2,324,179
MIXING MACHINE
Filed March 16, 1942
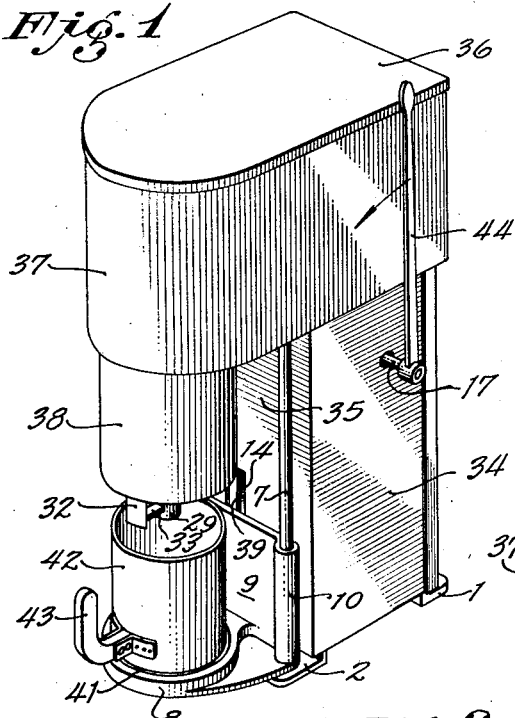
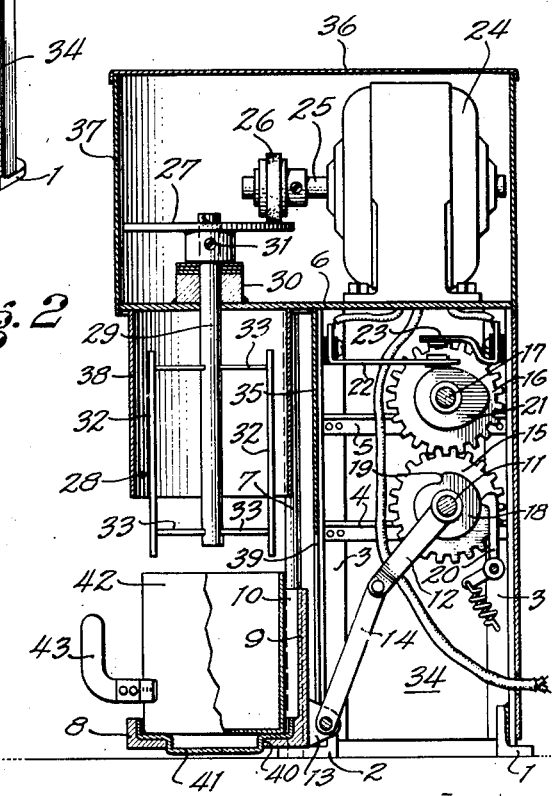
Inventor,
MICHAEL SROB;
By Calvin Brown
Attorney Patented July 13, 1943

2,324,179

UNITED STATES PATENT OFFICE 2,324,179

MIXING MACHINE

Michael Srob, Los Angeles, Calif.

Application March 16, 1942, Serial No. 434,807

3 Claims. (Cl. 259—108)

This invention relates to mixing machines, and has for an object a mixing machine which is adapted to make what are known as "heavy malts." So-called "heavy malts" are mostly formed of ice cream, very little milk being used. As a rule, the ice cream is placed in a suitable container, together with a small amount of milk and a flavoring syrup. The average mixer will not stir this mix. The present invention provides a machine that will stir the ice cream and make it semi-fluid and properly incorporate the flavoring syrup.

An object of the invention is the provision of a mixer in which sanitation is a primary factor, in that all working parts other than the agitator are not in position to be brought into contact with the material to be mixed.

Another object is the provision in a mixer of means whereby the material being agitated is enclosed during such agitation so that foreign elements cannot accidentally drop therein.

The present invention contemplates a machine so constructed and arranged that when the material to be mixed is in proper engagement with an agitator that the agitator will be rotated to perform the mixing operation.

The present invention incorporates a movable shelf upon which is placed a suitable container. This container is adapted to receive the material to be mixed such as, for instance, ice cream. This container is elevated within a suitable guard, the guard housing or confining an agitator. When the container is moved within the guard to receive the agitator, the agitator is rotated through a suitable motor. The operation of raising the shelf to position the container within the guard completes an electrical circuit to the motor, and a lowering of the shelf automatically breaks the circuit to the motor and stops movement of the agitator.

Other objects of the invention include a mixer which is inexpensive in cost of manufacture, and generally superior to mixers now known to the inventor.

With the above mentioned and other objects in view, the invention consists in the novel and useful provision, formation, construction, association, and relative arrangement of parts, members and features, all as shown in a certain embodiment in the accompanying drawing, described generally, and more particularly pointed out in the claims.

In the drawing:

Figure 1 is a perspective view of the improved mixer as an entirety, and,

Figure 2 is a vertical sectional view of the mixer.

Referring now to the drawing, the improved mixer includes a pair of angle feet 1 and 2, to which are secured spaced-apart upright angle type posts, designated generally as 3, and of which there may be four. These posts are separated, as shown in Figure 2. Suitable cross members 4 and 5 are secured between pairs of aligned posts. The posts support at their upper ends a platform 6. Extended between the platform 6 and the angle foot 2 are a pair of spaced-apart, substantially parallel rods 7. A shelf 8 is provided with a piece 9 having elongated end eye members 10, through which eyes are passed the rods 7, the eyes functioning as slide bearings. A shaft 11 in bearing engagement between a pair of the braces 4 has secured thereto arm 12. Between the arm 12 and a stud 13, secured centrally to piece 9, is a link 14. Thus, upon rotation of shaft 11 in a clockwise direction, viewing Figure 2, the arm will move the link to elevate the shelf, said shelf being guided as to movement by the slide bearings on the rods 7. Shaft 11 has secured thereto gear 15, the teeth of which are in mesh with a gear 16 carried on a shaft 17. Shaft 17 is mounted in suitable bearings carried by the cross pieces 5. The shaft 11 carries a member 18 notched at 19 and a spring-actuated dog 20 is in constant engagement with the periphery of member 18 in such a manner that when the shaft 11 is rotated clockwise to raise the shelf to a defined position, the dog engages the notch and prevents retrograde movement of the shelf.

The shaft 17 carries a cam 21. This cam is adapted to move the contact arm 22 to bring said contact arm into engagement with contact point on contact arm 23 when the shelf has reached a defined elevation.

The platform 6 supports a motor 24. The shaft 25 of said motor carries a friction wheel 26 which is in engagement with a friction disc 27. An agitator 28 has its shaft 29 passed through a suitable bearing 30 and pinned at 31 to an enlargement of the disc 27.

The agitator includes substantially parallel elongated members 32 secured by members 33 to the shaft 29.

The working parts of the mixer are all enclosed by providing sheets, such as illustrated at 34 and 35, between the uprights 3, and the motor and the disk 27 are enclosed by top and side members 36 and 37. The agitator and its shaft are closed by a cylindrical casing 38. The member 35 is slotted at 39 to accommodate both the link 14 and the stud 13. In the drawing, the shelf is shown as having a central opening at 40 to accommodate a cup 41. The container 42 is adapted to be carried by the cup, and this container is provided with a handle 43 which is externally positioned of the cylindrical casing 38 when the cup is raised within said casing. A lever 44 is secured to the shaft 17.

The operation, uses and advantages of the invention are as follows:

If ice cream is placed in the container 42 together with suitable syrup, the operator positions the container on the cup 41 and then moves the handle 44 downward in an anti-clockwise direction, viewing Figure 1. Movement of the handle will rotate shaft 17 in such a manner that the cam 21 will bring contact arm 22 into engagement with the contact point of arm 23 and complete a circuit to the motor 24, it being assumed that the motor and contact arms are connected with a suitable source of current supply. Such movement will likewise rotate the shaft 11 through the inter-meshing gears carried by said shafts. The shelf 8 is elevated so that the agitator is brought within the confines of the container. As the motor has been energized, the motor, through the friction wheel 26, will drive the disc 27 and rotate the agitator. After a given period of time, the handle 44 is moved to the position shown in Figure 1, the handle being jerked slightly at the beginning of movement so as to disengage the dog from the notch 19 of member 10. In this manner, the contact arms 22 and 23 are separated, which breaks the circuit to the motor. As stated, the dog, by its engagement with the notch 19, will hold the shelf in an upward position during movement of the agitator within the container.

I claim:

1. In construction of the character disclosed, a pair of spaced shafts, intermeshing gears carried by said shafts, a cam secured to one of said shafts, a pair of contact arms, one of which is engaged by said cam to move said contact arm into engagement with the other arm when the cam is rotated, a shelf, an arm secured to the second of said shafts, and a link connection between said arm and said shelf; a motor connected with a source of electric supply through said contact arms, an agitator to be rotated by said motor; rotation of the shaft carrying said cam rotating the second shaft to raise the said shelf to a position immediately adjacent the agitator, the switch arms being in contact to complete the electric circuit to said motor and cause rotation of the agitator.

2. In construction of the character disclosed, a pair of spaced shafts, intermeshing gears carried by said shafts, a cam secured to one of said shafts, a pair of contact arms, one of which is engaged by said cam to move said contact arm into engagement with the other arm when the cam is rotated, a shelf, an arm secured to the second of said shafts, and a link connection between said arm and said shelf; a motor connected with a source of electric supply through said contact arms, an agitator to be rotated by said motor; rotation of the shaft carrying said cam rotating the second shaft to raise the said shelf to a position immediately adjacent the agitator, the switch arms being in contact to complete the electric circuit to said motor and cause rotation of the agitator, and means operatively associated with said second shaft for holding the shelf elevated.

3. In construction of the character disclosed, a shaft, a cam secured to said shaft, a pair of switch arms, one of which is engaged by said cam to move said arm into engagement with the other arm when the cam is rotated a determined amount, a shelf, an arm movable upon rotation of the shaft, and a link connection between said arm and said shelf; a motor connected with a source of electric supply through said switch arms, an agitator to be rotated by said motor; rotation of the shaft carrying said cam moving the said arm and link to raise said shelf to a position immediately adjacent the agitator, the switch arms being in contact to complete the electric circuit to said motor to cause rotation of the agitator.

MICHAEL SROB.